(12) United States Patent
Zajac

(10) Patent No.: US 10,531,158 B2
(45) Date of Patent: *Jan. 7, 2020

(54) MULTI-SOURCE VIDEO NAVIGATION

(71) Applicant: CURRENT PRODUCTIONS, Paris (FR)

(72) Inventor: Cyril Zajac, Paris (FR)

(73) Assignee: CURRENT PRODUCTIONS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/848,927

(22) Filed: Dec. 20, 2017

(65) Prior Publication Data

US 2018/0167685 A1   Jun. 14, 2018

Related U.S. Application Data

(63) Continuation of application No. 14/390,604, filed as application No. PCT/FR2013/050751 on Apr. 5, 2013, now Pat. No. 9,883,244.

(30) Foreign Application Priority Data

Apr. 5, 2012 (FR) ...................... 12 01018

(51) Int. Cl.
*H04N 5/445* (2011.01)
*H04N 21/4722* (2011.01)
(Continued)

(52) U.S. Cl.
CPC ......... *H04N 21/4722* (2013.01); *H04N 7/181* (2013.01); *H04N 21/2187* (2013.01);
(Continued)

(58) Field of Classification Search
CPC .......... H04N 21/4722; H04N 21/8547; H04N 21/4725; H04N 21/4622; H04N 21/4223;
(Continued)

(56) References Cited

U.S. PATENT DOCUMENTS 7,603,683 B2 * 10/2009 Reto ................. H04L 29/06027
709/204
8,307,395 B2 * 11/2012 Issa ........................ G06Q 10/10
725/46

(Continued)

OTHER PUBLICATIONS

French Preliminary Search Report issued in related application FR 12 01018, dated Jan. 25, 2013, 1 page.
(Continued)

*Primary Examiner* — Michael B. Pierorazio
(74) *Attorney, Agent, or Firm* — Drinker Biddle & Reath LLP

(57) ABSTRACT

A method of multi-source video navigation, comprising: receiving an image sequence, each image of said sequence comprising a plurality of image parts, the image parts of said plurality comprising image data arising from synchronized images of respective video streams, each video stream arising from a corresponding source, receiving a selection parameter value arising from a user interface, said value corresponding to one at least of said video streams, and instructing the displaying of the at least one image part, from among the image parts of this plurality, corresponding to the value of the selection parameter received.

15 Claims, 4 Drawing Sheets

(51) Int. Cl.

| | | |
|---|---|---|
| *H04N 21/4223* | (2011.01) | |
| *H04N 21/43* | (2011.01) | |
| *H04N 21/431* | (2011.01) | |
| *H04N 21/462* | (2011.01) | |
| *H04N 21/4725* | (2011.01) | |
| *H04N 21/81* | (2011.01) | |
| *H04N 7/18* | (2006.01) | |
| *H04N 21/2187* | (2011.01) | |
| *H04N 21/2343* | (2011.01) | |
| *H04N 21/8547* | (2011.01) | |

(52) U.S. Cl.
CPC . *H04N 21/234345* (2013.01); *H04N 21/4223* (2013.01); *H04N 21/4307* (2013.01); *H04N 21/4316* (2013.01); *H04N 21/4622* (2013.01); *H04N 21/4725* (2013.01); *H04N 21/816* (2013.01); *H04N 21/8547* (2013.01)

(58) Field of Classification Search
CPC ........... H04N 21/4316; H04N 21/4307; H04N 21/816; H04N 21/2187; H04N 21/234345
USPC .......................................................... 725/56
See application file for complete search history.

(56) References Cited

U.S. PATENT DOCUMENTS

| | | | | |
|---|---|---|---|---|
| 9,883,244 | B2* | 1/2018 | Zajac | H04N 7/181 |
| 2002/0049979 | A1 | 4/2002 | White et al. | |
| 2002/0091564 | A1* | 7/2002 | Geller | G06O 99/00 |
| | | | | 705/12 |
| 2004/0008220 | A1* | 1/2004 | Snyder | G06F 3/0481 |
| | | | | 715/716 |
| 2004/0117831 | A1* | 6/2004 | Ellis | H04N 5/44543 |
| | | | | 725/53 |
| 2005/0262542 | A1* | 11/2005 | DeWeese | H04L 12/1818 |
| | | | | 725/106 |
| 2005/0273830 | A1* | 12/2005 | Silver | H04N 5/4401 |
| | | | | 725/105 |
| 2006/0107289 | A1 | 5/2006 | DeYonker et al. | |
| 2006/0190966 | A1* | 8/2006 | McKissick | G06Q 30/02 |
| | | | | 725/61 |
| 2007/0072543 | A1* | 3/2007 | Paila | H04H 20/38 |
| | | | | 455/3.06 |
| 2008/0051026 | A1* | 2/2008 | Kim | H04W 72/005 |
| | | | | 455/3.01 |
| 2008/0065507 | A1* | 3/2008 | Morrison | G06Q 30/0613 |
| | | | | 705/26.3 |
| 2008/0100731 | A1 | 5/2008 | Moscovitch | |
| 2008/0146342 | A1* | 6/2008 | Harvey | A63F 13/10 |
| | | | | 463/42 |
| 2008/0194334 | A1* | 8/2008 | Kuok | G07F 17/3223 |
| | | | | 463/42 |
| 2009/0228508 | A1 | 9/2009 | Date et al. | |
| 2009/0319601 | A1* | 12/2009 | Zvonaric | G06Q 30/02 |
| | | | | 709/203 |
| 2010/0070999 | A1* | 3/2010 | Morris | H04N 7/17318 |
| | | | | 725/39 |
| 2010/0157016 | A1 | 6/2010 | Sylvain | |
| 2010/0235857 | A1 | 9/2010 | Lestage et al. | |
| 2011/0090347 | A1 | 4/2011 | Buckner et al. | |
| 2011/0107220 | A1* | 5/2011 | Perlman | A63F 13/12 |
| | | | | 715/720 |
| 2011/0216153 | A1* | 9/2011 | Tasker | H04N 7/147 |
| | | | | 348/14.02 |
| 2011/0237318 | A1* | 9/2011 | Sama | G07F 17/3225 |
| | | | | 463/9 |
| 2012/0094737 | A1* | 4/2012 | Barclay | G07F 17/3213 |
| | | | | 463/20 |
| 2012/0120183 | A1* | 5/2012 | Gagneraud | H04N 5/232 |
| | | | | 348/14.08 |
| 2012/0137316 | A1* | 5/2012 | Elizarov | H04H 20/38 |
| | | | | 725/9 |
| 2012/0158852 | A1* | 6/2012 | Goldsmith | G06Q 10/10 |
| | | | | 709/205 |
| 2012/0169836 | A1* | 7/2012 | Setlur | H04L 12/1827 |
| | | | | 348/14.11 |
| 2012/0172117 | A1* | 7/2012 | Doorgeest | A63F 13/26 |
| | | | | 463/31 |
| 2013/0070143 | A1 | 3/2013 | Jang et al. | |
| 2013/0312041 | A1* | 11/2013 | Gresta | H04N 21/2365 |
| | | | | 725/61 |

OTHER PUBLICATIONS

International Search Report issued in related application PCT/FR2013/050751, dated Jun. 26, 2013, 3 pages.

\* cited by examiner

MULTI-SOURCE VIDEO NAVIGATION

CROSS-REFERENCE TO RELATED APPLICATIONS

This application is a continuation of U.S. patent application Ser. No. 14/390,604, filed Oct. 3, 2014, which is the U.S. National Phase of the International Patent Application No. PCT/FR2013/050751, filed Apr. 5, 2013, claiming priority based on French Patent Application No. 1201018 filed Apr. 5, 2012, the contents of all of which are incorporated herein by reference in their entirety.

BACKGROUND

The invention relates to multisource video navigation, and especially to multi-angle video navigation (a.k.a. multi-angle switching).

Such a method employs a plurality of video sources, for example a plurality of video cameras. Typically, a plurality of video cameras may be placed at different positions around a given scene, so as to acquire a number of views of this scene, for example a front view, a medium close up of one of the protagonists and a side view.

The final user is able to choose the sequence of images, from the various video sequences originating from the various respective sources, he or she would like to view, and to change the sequence being viewed.

Methods that make it possible to navigate a plurality of video sources do exist. For example, document US 2011/0090347 describes a method in which a plurality of video sequences, each sequence originating from a respective video camera, are transmitted over an Internet type network. These streams are received and displayed on a terminal of a user, who may select one of the streams, called the main stream, for display in a larger window. Nevertheless, when this user goes to change the main stream, synchronization problems and image quality degradation may occur.

There is a need for an improved user experience.

SUMMARY

Thus, a method for navigating multisource video is provided comprising a step of receiving a sequence of images, each image of said image sequence comprising a plurality of image portions, the image portions of said plurality comprising image data originating from synchronized images of respective video streams, each video stream originating from a corresponding source.

The method furthermore comprises a step of receiving a choice parameter value originating from a user interface, this value corresponding to one at least of said video streams, and a step of commanding display of the at least one image portion, from the image portions of said plurality, corresponding to the received choice parameter value.

This method thus makes it possible to pass from one source to another without delay. When the user decides to change the main stream, by selecting a stream corresponding to another image portion of the plurality of image portions, he or she is not troubled with any synchronization problems since each received image comprises image portions that have already been synchronized. The navigation device simply displays an image portion other than that currently being viewed by the user.

Furthermore, image quality degradation related to the use of terminal resources to change the stream to be displayed is prevented.

Advantageously the method may furthermore comprise, for at least one received image, a step of commanding display of an additional image portion comprising a plurality of image data sets, each image data set originating from a respective video stream.

For example, each image data set may originate from a corresponding image portion of an image of the received sequence, for example the current image, a preceding image, a following image, etc. The image data sets of the additional image may advantageously be synchronized and related to the current image.

Thus, the user may see, in addition to the image portion of the plurality of image portions, the additional image portion, which may provide information regarding the other video streams. This may make it possible to assist the user, and to provide a more user-friendly interface.

Each image data set may comprise a smaller image data set obtained by compressing the corresponding image of the corresponding video stream, for example by compressing data of the image portion of the received current image. The user may thus see small icons showing miniature images corresponding to the unselected stream(s).

It will be noted that each icon location may correspond to a single source, which may help the user select the source to be displayed. Thus, the sources will possibly be better identified than in document US 2011/0090347, which may be particularly advantageous for a user production application.

Advantageously, the display of the additional image portion is commanded for a plurality of images of the received sequence. Thus it is possible to create an impression of movement.

Advantageously, the display of the additional image portion is such that, if the user clicks on an icon of this additional image portion, a value of the choice parameter corresponding to the image portion associated with this icon is received.

Navigation is thus relatively simple and intuitive, since the user only has to click on an animated icon to select the source corresponding to this icon.

Advantageously and nonlimitingly, display of the at least one image portion corresponding to the received choice parameter value and of the additional image portion may be commanded by means of a single media player.

Alternatively, two media players could of course be used.

Advantageously, the method may comprise, for at least one current image of the received sequence:

(a) a step of capturing at least one image portion of this current image, and (b) a step of commanding image display of an image originating from the at least one captured image portion.

Advantageously, steps (a) and (b) may be reiterated for at least one other image of the received sequence, so as to create the illusion of a video display of said image originating from the at least one captured image portion.

Thus, this imagewise display uses relatively few computational resources. The method described above may be implemented with a single media player.

Specifically, a Flash® player is in general capable of generating a video display of only a single video stream at a time. By repeatedly using image displays, it is possible to create the illusion of an additional video display.

Alternatively, provision could be made not to reiterate step b), or else to reiterate it with a relatively low frequency, so that the user sees a stationary image, especially if the additional image portion is concerned. Thus, the user will for example be able to see a strip composed of thumbnails of stationary (or infrequently updated) images each corresponding to a viewing angle.

Alternatively, provision will possibly be made to use a media player capable of carrying out a video display of a plurality of video streams at the same time.

The step of capturing one or more image portions may be carried out by tracing the video file. In particular, with a Flash® or Flex® reader the functions BitmapData.draw and BitmapData.copypixel will possibly be used to carry out steps (a) and (b), respectively.

The additional image portion may be generated user side, for example by a multisource video navigation device, or else server side.

In one embodiment, in step (a), at least one, advantageously at least two, image portions are captured from the plurality of image portions of a current image of the sequence of received images. Next, the additional image portion may be generated from this or these captured image portions, for example by decreasing the size of each captured image portion and by placing each resized image portion so as to form a strip, a pie chart, etc.

In step (b), an image display of the additional image portion may advantageously be commanded.

Thus, the additional image portion is generated user terminal side. The received image sequence may comprise images simply with image portions corresponding to respective sources.

This embodiment is furthermore advantageous in that, since the generation of the additional image portion is for example carried out by the media player, it is relatively easy to adapt the generation of this additional image, for example in order to add a thumbnail originating from a third-party sequence (corresponding to advertising content for example, to an already edited video, etc.), to create the illusion of thumbnail motion, etc. This embodiment therefore easily makes it possible to ensure that the generation of the additional image portion retains a certain flexibility.

In another embodiment, provision may be made for at least certain of the received images to comprise the additional image portion. The additional image portion is thus generated by a remote server, and received as such.

In the capturing step (a), an image portion chosen from the additional image portion and one image portion of the plurality of image portions of the current image (comprising an additional image portion) may be captured, and in step (b), an image display of the captured image portion may be commanded.

The processing implemented by the player is therefore relatively simple.

Advantageously, a video display is carried out for one of the image portions, for example one of the image portions of the plurality of image portions, and an image display is carried out for another of the image portions, for example the additional image portion.

In order to generate a video display of only one portion of the images of the received sequence, video display, enlargement and relocate/reposition functions may for example be used. In the case of a Flash® or Flex® reader, the video functions OSMeframework and/or MediaContainer may for example be used for the video display, the scale function and the component attributes width and height may for example be used for the enlargement and the component attributes x and y may for example be used for the relocate/reposition operation.

Alternatively, provision may be made for an image display of both these image portions.

In one embodiment, provision may be made to temporarily stop the image display, over a given number of received images, for example, or for a given period of time, and instead to generate a video display, for example from another stream. For example, provision will possibly be made for the screen location corresponding to the icons, or even to at least one icon, to be used temporarily to display an advertisement.

The image portions of a given image of the received sequence may form a partition of this image, be interlaced, etc.

The invention may advantageously be applied to the field of multi-angle video navigation, but the invention is in no way limited to images of a given scene. It will for example be possible to provide video streams originating from different video cameras and relating to different scenes, for example images showing New Year's Eve festivities near midnight in a number of French towns.

The images may be acquired by a video camera, be synthetic images, etc.

The images may undergo certain processes such as chroma keying, color grading, etc. or not.

The images of the received sequence of images may comprise audio data, corresponding for example to an audio track. Provision may be made for a single audio track per image, or even a plurality of audio tracks.

In the latter case, provision will possibly be made for one audio track (or audio data set) for each image portion of the plurality of image portions. When the user selects a source, the image portions (of a plurality of received images) corresponding to this source are displayed and the audio data set (of a plurality of received images) is played.

Advantageously and nonlimitingly, provision may furthermore be made for a step of memorizing the values of the choice parameter received from the user interface, so as to associate with each choice parameter value an input date value, for example the amount of time passed since viewing started, clock data, an image number, etc. This memorization may thus give the user the impression that the video that he or she has produced may be replayed.

Advantageously and nonlimitingly, provision may furthermore be made for a step of transmitting these memorized data to a server. This may allow statistics to be collected regarding the various editing choices made by users, a collaborative video to be produced, etc.

Advantageously and nonlimitingly, the method may furthermore comprise:
  receiving from a remote server at least one choice parameter value and at least one date value corresponding to said at least one choice parameter value, and
  generating, depending on said date and choice parameter values, command data intended for the user interface, in order to signal to the user at least one video stream corresponding to said received values.

By definition, the expression "production data" is understood, for a given video, to mean a set of choice parameter values and of associated date values. These production data may be inputted by one or more users.

The date and choice parameter values may for example have been obtained from production data input by a group of users. In other words, the choice parameter value received from the server is obtained from a plurality of choice parameter values originating from a plurality of respective terminals and corresponding to the date value.

Alternatively, these values may be generated by a single person, for example a recognized producer.

The invention is in no way limited by the nature of the command data.

For example, the command data may comprise a message asking for a colored frame to be displayed around the thumbnail corresponding to the stream corresponding to the received choice parameter value. The user may for example click on a tab entitled "community production" etc., see a red frame displayed around the thumbnail corresponding to the stream chosen most by a group of web users, and optionally see this video displayed as the main video (display of the corresponding image portion). During playback, the user may see the red frame move from one thumbnail to another, depending on the received community production data.

Thus, the command data may make it possible to implement a signaling element, for example a red frame, an arrow, black-and-white display of the other thumbnails, blurring out of the other thumbnails, etc.

The invention is in no way limited to a visual signal. For example, the stream corresponding to a current choice parameter value may be signaled by means of an audio signal.

The invention is also not limited to the use of a visual and/or audio signaling element. For example provision could be made to display an additional thumbnail corresponding to the stream currently elected by the one or more remote users.

Thus, the additional image portion may be generated from choice parameter values and date values corresponding to said choice parameter values received from a remote server.

This generation may also be carried out by a remote server, so that only certain of the received images comprise an additional image portion with, for example, an icon corresponding to an already edited video.

Alternatively, this generation may be carried out by a terminal, from the image portions corresponding to the respective sources and from choice parameter values and the associated date values.

For example, a user may be given the option of viewing a video edited beforehand by another user, for example a famous producer or even the winner of a competition. This option may be generated by the media player. Following an input via the user interface, the navigation device receives producer selection data and sends a message to a server in order to command generation of a sequence of images including video image data edited by the producer corresponding to these selection data, or even in order to command the transmission of another video sequence containing the images of this already edited video. Alternatively, provision may be made for the server to merely transmit production data corresponding to this producer, these data being streamed or indeed downloaded, and for the media player, from the received sequence and received production data, to display regularly, in one thumbnail of the strip, the decreased size image portion corresponding to the choice data of this instant, so as to create the illusion that the produced video is being played in this thumbnail.

In one embodiment, the production data may be determined from production data generated by a sample group of users, be obtained by statistical calculation from a sample group of production data sets. A user may thus be given the option of viewing a video produced collectively. If this option is chosen, the player commands image portions corresponding to the community production data to be displayed on the fly, so as to create the illusion of this video being played.

The additional image portion may thus be generated from the plurality of image portions and from the production data. This generation may be carried out in a remote server, but advantageously generation will preferably be carried out by a media player.

For example, the screen of the terminal may display a strip containing six icons, five of which each correspond to a video stream originating from an associated source, and the sixth of which corresponds to a video itself obtained by editing of the five other streams.

Provision may be made for the plurality of image portions to comprise an image portion corresponding to this already edited video, in which case, if the sixth icon is clicked on, the player merely generates a video display of this sixth image portion. The display of an already edited video is thus transparent for the player.

Alternatively, provision may be made for the plurality of image portions to only comprise image portions each corresponding to a single source. In which case, if the sixth icon is clicked on, the player reads the production data corresponding to the edited video and generates a display of other image portions by applying these production data. Thus, there is no need to transmit the same image data twice and the server may thus always generate the same sequence of images, simply with the image portions corresponding to the various sources.

Advantageously and nonlimitingly, the method may comprise:
storing in memory the choice parameter values received from the user interface, so as to associate an input date value with each value of the choice parameter.

Advantageously the method may furthermore comprise:
transmitting to a server the stored choice parameter values and the associated input date values, for example for statistical purposes, etc.

Thus, the user may also participate in the production of a collective video.

The navigation may be carried out live, for example on live television, or on recorded content.

Advantageously and nonlimitingly, the method may furthermore comprise a step of receiving at least one additional sequence of images.

Advantageously and nonlimitingly, the method may comprise a step of displaying at least one portion of a least one image of this additional sequence.

Advantageously and nonlimitingly, the method may comprise a step of capturing at least one image portion originating from one image of said at least one additional sequence, and a step of commanding image display of an image originating from said at least one captured image portion, for example an image obtained by decreasing the captured image in size, or even the captured image itself. The capture and display command steps may be reiterated for other images of this at least one additional sequence. Thus, the tracing and image display functionalities may once more be used to create the illusion of a video display for this or these additional sequences.

The additional sequence may have been read from a memory of the user terminal, acquired by a webcamera, received from a telecommunications network, generated by user editing, and/or etc. It may for example be a question of a video sequence created by the user.

The image display of data originating from this additional sequence may for example consist in displaying an icon showing a current image of this additional sequence in miniature, the reiteration of this display making it possible to create the illusion of movement. When the player generates the additional image portion by capturing image portions from the plurality of image portions of the current image of the received sequence, provision may furthermore be made for the player to capture an image from this additional sequence, to decrease this captured image in size and to generate the additional image portion by including therein the captured and resized image portions and this captured and resized image originating from the additional sequence.

By superposing this icon on a mouse select window, it is possible to allow the user to select this additional sequence with a single click, just like the streams originating from the various sources, the data of which are assembled in the images of the received sequence of images.

If a choice parameter value corresponding to this additional sequence is received, the device generates a video (or image) display of this additional sequence, and no longer of the sequence conveying the image data of the other streams.

Thus it is possible to provide a playlist type function allowing the user to dynamically supply the player with a plurality of videos.

In the present application, the expression "at least one" is understood to mean "one or more".

Provision may also be made to use the terminal to acquire one of the video sequences from which the sequence of images is generated. Alternatively, a capturing device employed to acquire a video sequence may be separate from the navigation device.

The sources of the various video streams may or may not be preset.

Advantageously, a method may be implemented allowing the various capturing devices to be chosen in a flexible and dynamic way. This method may comprise steps of communication between capturing devices and a server leading to a plurality of capturing devices being associated with a given capture session.

The method implemented in a capturing device may for example comprise:
  A step of receiving multisource video capture session identification data, originating from a user interface of this capturing device; these data may for example comprise a session number, a Boolean variable value input in response to a session subscription invitation, etc.
  A step of transmitting said data to a server, with data identifying the capturing device, for example a terminal and/or sources associated with this terminal, with a view to associating these identification data with this session.

The server will possibly combine the streams originating from capturing devices associated with this session into a composite sequence.

Furthermore, provision may advantageously be made for a step consisting in receiving identification data from at least one other capturing device, for example another source and/or at least one other terminal, also subscribed to this session, said data originating from the server.

For example, on a capturing device of a user, for example a smartphone with an integrated video camera, a tablet computer, etc., a message is displayed, on request by the user, inviting session identification data to be inputted. The capturing device receives identification data of a given session and identification data of a user terminal and/or of one or more sources associated with this terminal. These data are transmitted to a server, which collects the identifiers of the terminals and/or of the sources thus associated with this session, and returns to each subscriber terminal a list of the other subscribed terminals and/or sources.

Advantageously, provision may be made to receive data signaling geographically close terminals and/or the identifiers of which belong to a given list, for example a list of friends, a list of terminals on which a multisource video capture application has been installed, etc. For each of these terminals, the signaling data may comprise an identifier of this terminal, and optionally data allowing this terminal to be located. The user may thus display the locations of other potential sources and optionally invite the users of judiciously placed terminals to participate in the capture of a given scene, etc.

This method may thus allow a plurality of sources to be obtained relatively easily, and probably more rapidly than if a plurality of persons had to meet and agree to film a scene together.

The video streams originating from the various sources of a given session are transmitted to a server, which synchronizes these sources, then generates a composite sequence, each image of this sequence comprising a plurality of image portions, each image portion being obtained from a corresponding source of the sources subscribed to this session.

Server side, a video delivery device may thus comprise processing means, such as a processor etc., possibly integrated into the processing means generating the composite stream, and arranged to receive session identification data and identification data from a plurality of capturing devices and to associate said capturing device identification data with said session.

The server will possibly combine the streams originating from capturing devices associated with this session into a composite sequence.

This composite sequence may thus be transmitted to various terminals, including or not the terminals used for the various captures, for multisource navigation purposes. The users of these terminals may therefore receive a multisource asset of relatively elaborate form relatively rapidly because this video asset may be obtained relatively easily with relatively little human intervention. For example, the people subscribed to the session merely film a scene: the various streams are automatically sent to a server, which generates a composite sequence and offers this sequence to a group of navigation devices. This method may thus enable more rapid and easier communication than in the prior art, in which providing a relatively elaborate video in general involves editing or other processes such as color grading, chroma keying, etc.

Provision may be made for the number of navigation devices to be equal to the number of image portions of the composite sequence, or higher than this number of image portions. For example, certain of the capturing devices subscribed to a session may be chosen in order for the composite sequence to be prepared only from video streams originating from the chosen capturing devices. This choice may be made by the server, randomly or not, for example depending on location data provided by the subscribed capturing devices, or else by a human. This person will for example possibly decide to replace a given stream with another stream in order to generate the composite sequence.

The composite sequence will possibly be transmitted to each of the terminals subscribed to the session, so that each subscribed user may see both their own video sequence and those of the other subscribed users. This transmission and this display may advantageously be carried out during the capture or rapidly after the capture, for example half an hour afterwards. The production data of each of the users may be collected and a collaborative video may thus be generated, optionally relatively rapidly. Thus, both the capture and the editing may be collaborative.

The method may thus comprise a step consisting in transmitting a captured video stream to a server, with a view to generating the sequence of images. The navigation terminal may thus also serve as a video source, or as a terminal in communication with one (or more) separate video source(s).

Furthermore, a device for navigating multisource video is provided, this piece of equipment comprising:

first receiving means for receiving a sequence of images, each image of said sequence comprising a plurality of image portions, the image portions of said plurality comprising image data originating from synchronized images of respective video streams, each video stream originating from a corresponding source, second receiving means for receiving a choice parameter value originating from a user interface, said value corresponding to one at least of said video streams, and means for displaying the at least one image portion, from the image portions of said plurality, corresponding to the received choice parameter value.

This device may thus allow the method described above to be implemented.

The invention is in no way limited by the form of this device. For example:

The first receiving means may comprise an RJ45 connector, a radio-frequency module, an input port of a processor, input pins, etc.

The second receiving means may comprise a mouse, a processor executing a mouse controlled program, a processor input port, input pins, etc.

The display means may comprise a processor core, an output port, a processor executing a screen controlled program, etc.

The navigation device may comprise or be integrated into digital means for processing the signal, for example a processor, for example a microprocessor, a digital signal processor (DSP), etc., or indeed even a terminal, for example a personal computer, a tablet computer, a smartphone, etc.

A computer program, storable on an information storage medium, for example a hard disk, a memory of a processor, etc. and/or downloadable via a communications network, and comprising instructions for executing the method described above when it is executed by a processor, is furthermore provided.

This program, for example comprising a media player, may be compatible with one or more Internet browsers. This player may for example support the following image formats: FLV, MP4, VP8, etc.

In particular, provision will possibly be made to allow coupling to a community sharing tool.

This program may be compatible with the operating system of a tablet computer, of a smartphone, etc.

A method for delivering video for multisource video navigation is furthermore provided, the method comprising:

receiving a plurality of video streams, each stream corresponding to one source, generating, from the received plurality of streams, a sequence of images, each image of said sequence comprising a plurality of image portions, the image portions of said plurality comprising image data originating from synchronized images of respective video streams, each video stream originating from a corresponding source, and transmitting said sequence to a terminal, via a telecommunications network, the Internet for example, via a broadcasting network, etc.

This method may make it possible subsequently to receive a video sequence containing a plurality of image portions originating from a plurality of respective synchronized sources.

The sequence of images may for example be broadcast by satellite, etc.

Provision may or may not be made for the images thus generated to furthermore comprise an additional image portion itself obtained from image data originating from the plurality of video streams.

The sources may be preset or not.

For example, provision may be made for a session opening step and a step of authenticating a certain number of sources for this session. Thus, a plurality of users may each subscribe one or more sources to this session, or a single user may subscribe a plurality of sources to this session.

A device for delivering video for multisource video navigation is also provided, this device comprising:

means for receiving a plurality of video streams, each stream corresponding to one source, processing means for generating, from the received plurality of streams, a sequence of images, each image of said sequence comprising a plurality of image portions, the image portions of said plurality comprising image data originating from synchronized images of respective video streams, each video stream originating from a corresponding source, and transmitting means for transmitting said sequence to a terminal.

This device may allow the method described above to be implemented. Here again, the invention is in no way limited by the form of the various means, nor by that of the delivery device.

The receiving means may for example comprise an input port, a cable, pins etc. The processing means may comprise a processor core, a dedicated processor, etc. The transmitting means may comprise an output port, a cable, a radio-frequency module, etc. The delivery device may comprise or be integrated into digital means for processing the signal, for example a processor, for example a microprocessor, a DSP, etc., or even a piece of equipment such as a server or a terminal, a mainframe for example, etc.

Advantageously and nonlimitingly, the processing means allowing the sequence of images to be generated may comprise a video multiplexing/distributing device, for example a device sold by Miranda under the Kaleido® trademark. Specifically, a video multiplexing/distributing device is able to generate a sequence of images from a plurality of streams so that each image of the generated sequence is partitioned into a plurality of image portions. For most of the image portions, the corresponding data result from minor compression of an image of an associated stream. A video multiplexing/distributing device is even able to generate a sequence of images, each image containing a strip-shaped portion in which image data from the conveyed streams are reproduced in the form of thumbnails or icons.

It is known to use a video multiplexing/distributing device to display a plurality of sources simultaneously, in a TV control room for example. Here, use is made of this type of device to generate a video stream of the type received by the multisource navigation device.

A computer program, storable on an information storage medium, for example a hard disk, a memory of a processor, etc. and/or downloadable via a communications network, and comprising instructions for executing the method described above, is furthermore provided.

The expression "sequence of images" is understood to mean the data corresponding to a sequence of images. The image data may be digital data allowing, after processing by a media player, an image to be displayed.

The invention is in no way limited by the number of sources: the plurality of video streams may for example comprise two, three, four, five, six, seven or eight or more streams. In the case where the plurality of image portions corresponding to this plurality of streams forms a partition of the image transmitted over the network, provision will possibly and advantageously be made for a plurality of four, six or eight image portions.

Advantageously and nonlimitingly, provision may be made for a step of receiving a stream number parameter value, originating from a user interface, and a step of transmitting this value to a server. Thus it is possible for the user to choose the number of streams. Following reception of this stream number value, the server sends a sequence of images containing a number of image portions corresponding to the required value, and furthermore containing an additional image portion comprising image data relating to the image portions of the transmitted sequence.

Advantageously and nonlimitingly, provision may be made for a step of receiving a plurality of source identifier values, each of these values corresponding to one video source, and a step of transmitting this plurality of values to a server. Thus it is possible for the user to choose the sources between which he or she would like to navigate. Following reception of this plurality of values, the server generates a sequence of images from video streams corresponding to the sources selected by the user.

Prior to this source choice, provision may for example possibly be made for a step of displaying a map showing the camera position, showing the positions of the various video cameras. The user will possibly click on a camera to select it.

Alternatively, provision may be made for a single image sequence generation operation that will therefore use a set number of sources and allow only for one source choice. Server side processing is thus limited.

The additional image portion may for example take the form of a strip, a column, a pie chart, etc. The additional image portion may especially comprise a plurality of icons located at the four corners of the displayed image.

BRIEF DESCRIPTION OF THE DRAWINGS

The invention will be better understood with reference to the figures, which illustrate embodiments given by way of example.

DETAILED DESCRIPTION

Identical references may be used from one figure to another to designate identical or similar objects.

Figure 1:
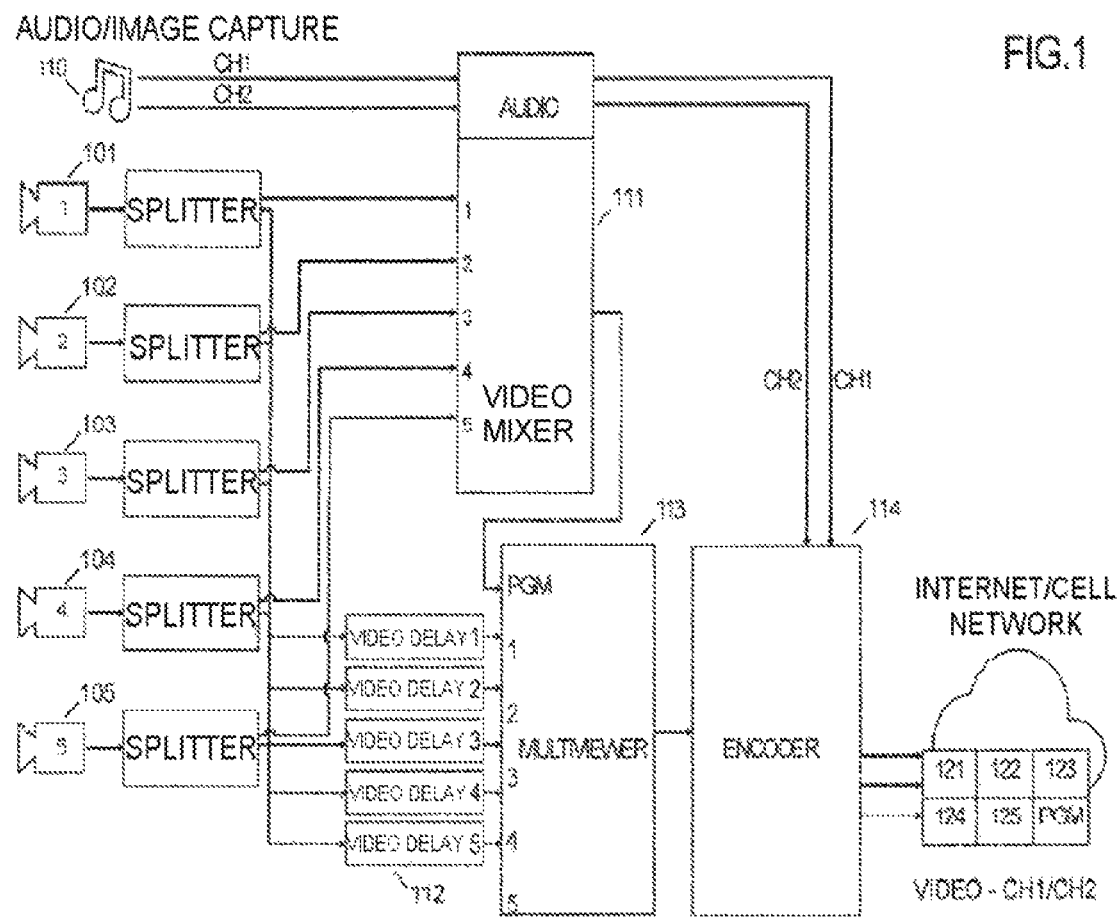
FIG. 1 schematically shows an example delivery device, according to one embodiment of the invention.

With reference to FIG. 1, five video sources, here five video cameras 101, 102, 103, 104, 105, allow five video streams to be acquired. A microphone 110 allows an audio track to be recorded.

These five video cameras may for example be placed around a stage in order to capture a concert, in a stadium in order to obtain images of a sporting event, etc. It will for example be possible to make provision to acquire images of a fashion show or an automobile (for marketing purposes for example). Among other example applications, mention may be made of television series or web-series for example, e-learning, etc.

After resynchronization, these five streams and the audio data are sent to a video mixer 111. This device 111 comprises a user interface and is arranged to enable editing by a technician.

The five resynchronized streams are furthermore sent over delay lines 112 in order to make up the delay induced by the editing in the mixing device 111. The streams output from the delay lines 112 and the stream (corresponding to a pre-produced video) output from the mixing device 111 are therefore synchronized.

These six streams are sent to a video multiplexing/distributing device Multiviewer 113, which generates from these six streams a sequence of images that are sent to a streaming device 114.

The device 113 is capable of generating a mosaic of images with a plurality of locations and arrangements. Optionally, a given stream may be displayed more than once, and with different sizes.

After encoding, this sequence of images may then be transmitted to a storage server, with a view to broadcasting, for example via a content delivery network (CDN).

In the example in FIG. 1, each image of the sequence of images is partitioned into six image portions 121, 122, 123, 124, 125 and PGM corresponding to the streams originating from the video cameras 101, 102, 103, 104, 105 and to the stream originating from the mixing device 111, respectively.

Figure 2:
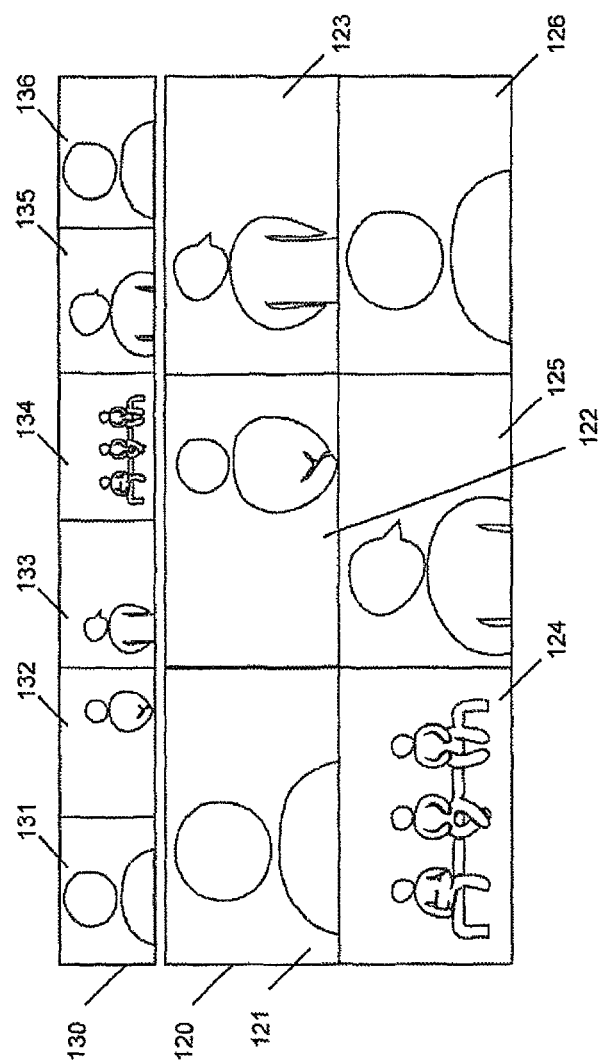
FIG. 2 shows an example image obtained from a sequence of generated images by applying an example method according to one embodiment of the invention.

FIG. 2 shows another example image generated by a delivery device according to one embodiment of the invention.

In this example, an image 140 of the video sequence comprises a zone 120 partitioned into six image portions 121, 122, 123, 124, 125, 126 and an additional image portion or thumbnail zone 130.

Each of the image portions 121, 122, 123, 124, 125 comprises image data originating from synchronized images of video streams originating respectively from five video cameras.

For example, the video camera corresponding to the portion 121 allows a frontal close-up of a first protagonist to be obtained, the video camera corresponding to the image portion 122 allows an American shot of a second protagonist to be obtained, the video camera corresponding to the portion 123 allows an American shot of a third protagonist to be obtained, the video camera corresponding to the image portion 124 allows a zoomed out view of three protagonists, including the first, to be obtained, and the video camera corresponding to the portion 125 allows a close-up of the protagonist corresponding to the image portion 123 to be obtained.

The image portion 126 comprises image data originating from a stream obtained by editing the five other streams. The image data of the image portion 126 are synchronized with those of the other image portions 121, 122, 123, 124, 125.

In other words, the data of this image portion 126 may be identical to that of one of the other image portions, here the portion 121.

For each of the streams originating from these video cameras and for the edited stream, each image of this stream is compressed by a factor of six or seven, then assembled with the other compressed images so as to form the zone 120.

The zone 130 comprises 6 subzones or thumbnails 131, 132, 133, 134, 135, 136. The content of each thumbnail originates from one or more compressions of the corresponding image of the stream associated with this thumbnail. In other words, each thumbnail 131, 132, 133, 134, 135, 136 is associated with a respective image portion 121, 122, 123, 124, 125, 126, and the image data of a thumbnail corresponding to a miniature of the image of the corresponding image portion.

In this embodiment, the zone 130 is generated in a remote server, and each image transmitted over the network comprises this strip-shaped zone 130.

In this example, each image portion 121, 122, 123, 124, 125, 126 is 640×360 pixels in size and each thumbnail 131, 132, 133, 134, 135, 136 is 320×180 pixels in size.

When the number of streams conveyed is smaller than six, the size of the image portions, and/or of the thumbnails, may be increased. For example, the size of the image portions may remain fixed whereas, for five streams, the thumbnails will occupy 384×216 pixels so that the zone 130 still forms a strip.

In an alternative embodiment, the received images of the sequence are devoid of a strip-shaped portion and simply comprise a plurality of image portions, for example six image portions. Thus, use of available band width is optimized so as to transmit useful information.

Figure 3:
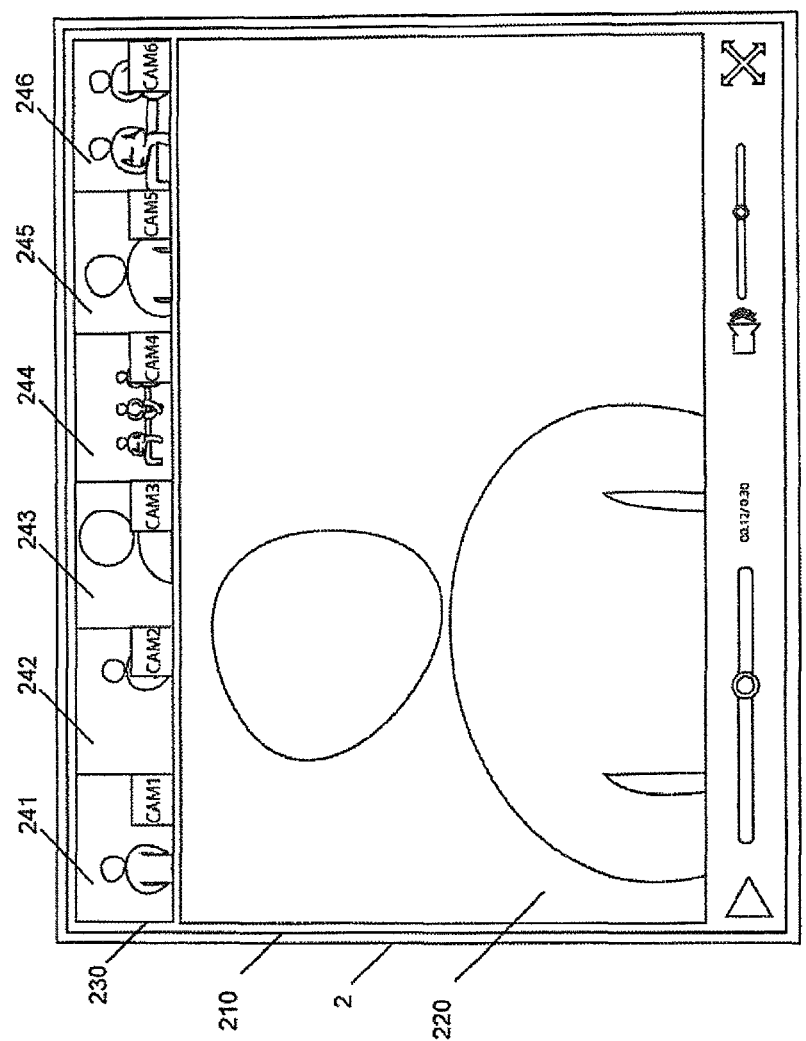
FIG. 3 shows an example screen display on a user terminal, obtained by applying an example multisource navigation method according to one embodiment of the invention.

With reference to FIG. 3, a window 200 of a media player, for example a Flash® player, comprises a display region 210 with a main display region 220 and a strip-shaped region 230 in which the thumbnails or icons 241, 242, 243, 244, 245, 246 of the zone 130 may be seen.

Each of these thumbnails is superposed on a layer, so that if the user clicks on a thumbnail, for example the thumbnail 241, the image data of the image portion 121 corresponding to this thumbnail 241 are displayed in the main display region 220. To change source, the user simply clicks on another thumbnail 242, 243, 244, 245, 246.

The selected thumbnail is highlighted by a graphical change. The selected/unselected state is graphically indicated by an overlay.

In this example, each thumbnail 241, 242, 243, 244, 245, 246 corresponds to one video camera. A video camera identifier, for example "CAM1", "CAM2", etc., is displayed superposed on each thumbnail.

The player furthermore comprises a play/pause button, a progress bar, etc.

Figure 4:
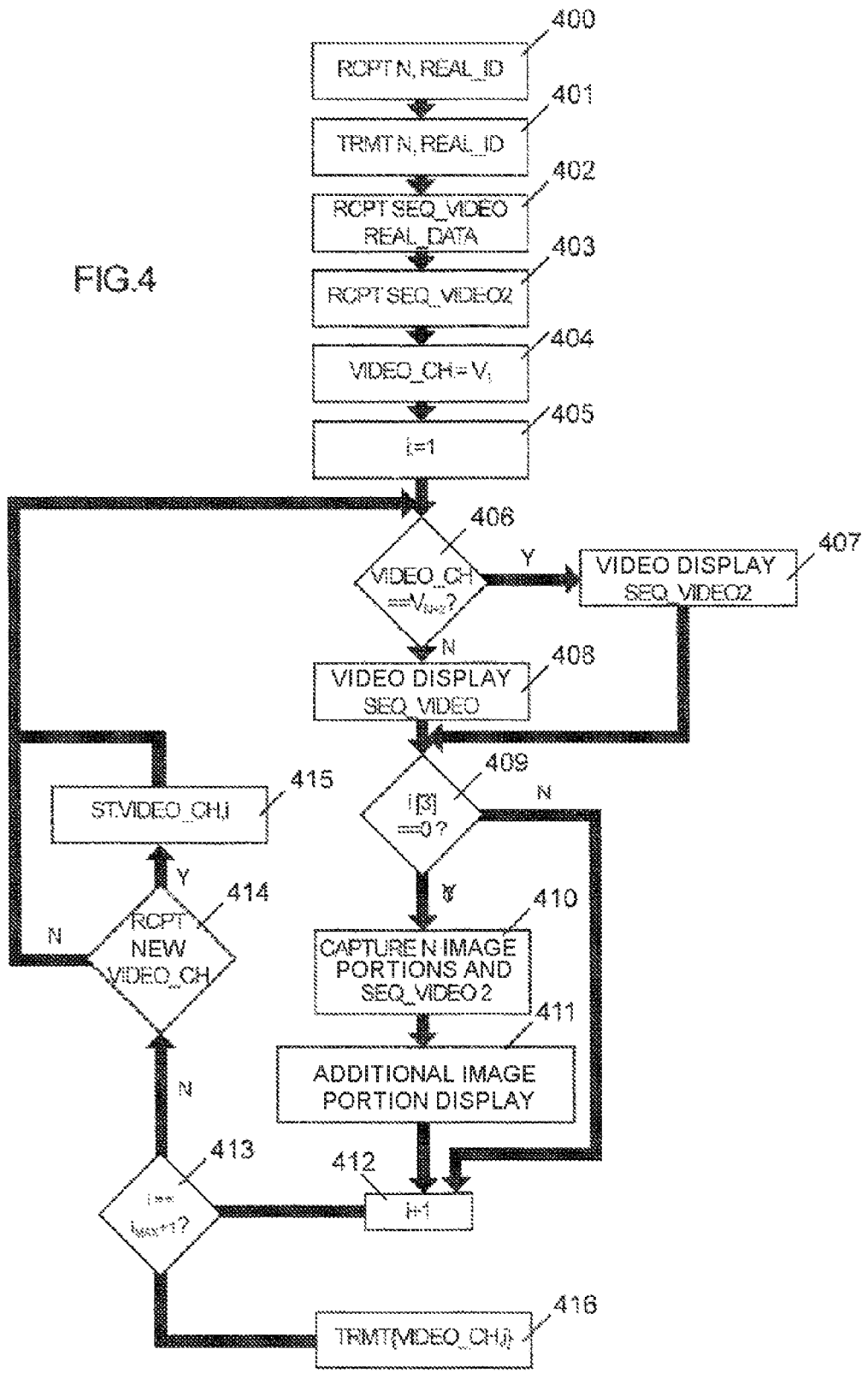
FIG. 4 is a flowchart illustrating one example multisource navigation method according to one embodiment of the invention.

With reference to FIG. 4, a navigation device, for example a terminal executing a suitable player program, may receive in a step 400 from a user interface, for example a mouse or a keyboard, a stream number parameter value N and a value of an identifier of a producer real_ID. This step 400 may take place after a step (not shown) of displaying an option regarding the number of streams and an option regarding the choice of a producer.

The producer identifier real_ID is capable of having a value corresponding to a collective production.

These values N, real_ID are transmitted to a server via an Internet type network, in a step 401.

Depending on the received values, a delivery device generates a sequence of images seq_video, containing N image portions, and transmits production data real_data corresponding to this identifier value real_ID. These production data comprise a set of stream choice values and associated date values.

This video sequence seq_video and these production data real_data are received in a step 402. These production data may take the form of an edit decision list (EDL).

In a step 403, another video sequence seq_video2 is received, for example a sequence acquired by a user webcamera.

Next, after initialization steps 404, 405, a loop, indexed i, is executed in order to run through all the received images of the video sequence seq_video.

Although steps 402, 403 are shown before the loop indexed i, it will be understood that reception of the images of the sequences seq_video, seq_video2 may continue while the loop is being executed: for example, for a given current i, the $(i+3)^{th}$ image of each of the sequences seq_video, seq_video2 may be received while the loop is being executed for the $i^{th}$ received image.

First a test 406 is carried out regarding the value of a choice parameter video_ch.

If the chosen video corresponds to the additional video sequence seq_video2, the player generates a video display of the $i^{th}$ image of this additional sequence, in a step 407.

In contrast, if the video chosen corresponds to one of the N sources or to the video edited beforehand by the producer, then the player generates a video display of the first image portion of the $i^{th}$ image of the sequence seq_video corresponding to this source or to the production data stream choice value for this index value i. This takes place in a step 408, use being made of video display, enlargement and relocation/reposition functions.

Next a test 409 is provided so that steps 410 and 411 are carried out only for one image in three.

Thus, if this test 409 is positive, video tracing is carried out in step 410, so as to acquire image data from N image portions of the current image of the sequence seq_video and of the current image of the additional sequence seq_video2. Next, these captured data are subjected to a processing (not shown), in which each image portion is decreased in size and placed on a strip, a pie chart, etc., so as to generate the additional image portion. Apart from the N thumbnails corresponding to each of the image portions of the $i^{th}$ received image, the additional image portion comprises:

- an $(N+1)^{th}$ thumbnail reproducing one of these N other thumbnails, this choice depending on the stream choice value for this $i^{th}$ image. The $(N+1)^{th}$ thumbnail shows to the user the video edited beforehand by the producer identified by the identifier real_ID;
- an $(N+2)^{th}$ thumbnail obtained by reproducing the current image of the additional sequence seq_video2.

This additional image portion thus generated, therefore comprising N+2 thumbnails, forms the subject of an image display in a step 411. It is these image displays, here generated for one image in three, that make it possible to create the illusion of thumbnail animation.

The user is thus able to see N+2 animated thumbnails.

The loop indexed i furthermore comprises conventional steps of output testing 413 and incrementing 412.

As long as viewing continues, if the test 414 shows that a new choice parameter value video_ch has been received, then this value video_ch is stored in memory with an input date value, here the current value of the index i, in a step 415. Next, execution of the steps of the loop allows the new chosen video to be viewed.

If the loop is terminated, the various memorized values of the choice parameter video_ch are transmitted in a step 416 to a server, with the corresponding indices. Such production data will possibly allow a third-party user to have the experience of replaying on their terminal the sequence edited by the current user.

During viewing, the audio track of the sequence seq_video is also played.

The invention claimed is:

1. A method for navigating multisource video executed by a user terminal, comprising:
receiving a sequence of images, each image of said sequence of images comprising a plurality of image portions, the plurality of image portions comprising image data originating from synchronized images of a plurality of respective video streams, each respective video stream of the plurality of respective video streams originating from a corresponding source,
receiving a choice parameter value originating from a user interface, the value corresponding to at least one respective video stream of the plurality of respective video streams, and
commanding the display of
at least one image portion of the plurality of image portions, corresponding to the received choice parameter value, for each image of a plurality of images of the sequence of images and of
an additional image portion comprising a plurality of image data sets, each image data set originating from a respective video stream of the plurality of video streams, wherein the image data of the additional image portion correspond to a time of the image data of the at least one image portion corresponding to the received choice parameter value, and
wherein the display of at least one of the at least one image portion corresponding to the received choice parameter value and the additional image portion is performed with the following, for at least one current image:
(a) a step of capturing at least one image portion of said current image,
(b) a step of commanding image display of an image originating from said at least one captured image portion,
and wherein steps (a) and (b) are reiterated repeatedly for subsequent images of the received sequence, so as to create the illusion of a video display of said at least one of the at least one image portion corresponding to the received choice parameter value and the additional image portion.

2. The method as claimed in claim 1, wherein, in step (a), at least two image portions are captured from the plurality of image portions of the current image,
the method furthermore comprising
generating the additional image portion from said at least two image portions captured in step (a),
and wherein, in step (b), an image display of said additional image portion is commanded.

3. The method as claimed in claim 1, furthermore comprising:
receiving at least one additional sequence,
capturing at least one image portion originating from one image of said at least one additional sequence,
commanding an image display of an image originating from said at least one captured image portion, and
repeating the capture and image display command steps for at least one other image of the received additional sequence, so as to create the illusion of a video display.

4. The method as claimed in claim 1, furthermore comprising:
receiving from a server at least one choice parameter value and at least one date value corresponding to said at least one choice parameter value, and
generating depending on said date and choice parameter values command data intended for the user interface, in order to signal to the user at least one video stream corresponding to said received values.

5. The method as claimed in claim 4, wherein the video stream corresponding to the values received from the server is signaled by means of a visual signaling element.

6. The method as claimed in claim 4, wherein the choice parameter value received from the server is obtained from a plurality of choice parameter values originating from a plurality of respective terminals and corresponding to the date value.

7. The method as claimed in claim 1, wherein display of the at least one image portion corresponding to the received choice parameter value and of the additional image portion is commanded by means of a single media player.

8. The method of claim 1, wherein the display of both at least one of the at least one image portion corresponding to the received choice parameter value and the additional image portion is performed with steps (a) and (b), with reiterations as to create the illusion of a video display.

9. The method of claim 1, wherein the display of a single one of the at least one image portion corresponding to the received choice parameter value and the additional image portion is performed with steps (a) and (b), with reiterations as to create the illusion of a video display, the display of the other one of the at least one image portion corresponding to the received choice parameter value and the additional image portion being an actual video display.

10. A computer program product comprising instructions for performing the steps of the method according to claim 1 when it is executed by a processor.

11. A method for navigating multisource video, comprising:
receiving by a user terminal a sequence of images, each image of said sequence of images comprising a plurality of image portions, the plurality of image portions comprising image data originating from synchronized images of a plurality of respective video streams, each respective video stream originating from a corresponding source,
receiving by the user terminal a choice parameter value originating from a user interface, the value corresponding to one at least of respective video streams of the plurality of video streams, and
commanding the display on the user terminal of at least one image portion of the plurality of image portions, that corresponds to the received choice parameter value,
commanding the display on the user terminal of an additional image portion comprising a plurality of image data sets, each image data set originating from a respective video stream of the plurality of video streams, and being synchronized with the at least one image portion corresponding to the received choice parameter value that is being displayed, wherein the display of the at least one image portion corresponding to the received choice parameter value and of the additional image portion is commanded by means of a single media player, by performing, for at least one of the at least one image portion corresponding to the received choice parameter value and the additional image portion, repeated captures from the sequence of images and image displays of a stationary image originating from the captured data, at a rate high enough to give the illusion of a video display of said at least one of the at least one image portion corresponding to the received choice parameter value and the additional image portion.

12. The method as claimed in claim 11, comprising
capturing at least two image portions from the plurality of image portions of the current image,
generating the additional image portion from said at least two captured image portions, and
commanding an image display of said additional image portion.

13. The method as claimed in claim 11, furthermore comprising:
receiving at least one additional sequence,
capturing at least one image portion originating from one image of said at least one additional sequence,
commanding an image display of an image originating from said at least one captured image portion, and
repeating the capture and image display command steps for at least one other image of the received additional sequence, so as to create the illusion of a video display.

14. A device for navigating multisource video, comprising at least one processing unit operating in conjunction with a memory to:
receive a sequence of images, each image of said sequence comprising a plurality of image portions, the image portions of said plurality comprising image data originating from synchronized images of respective video streams, each video stream originating from a corresponding source,
receive a choice parameter value originating from a user interface, said value corresponding to one at least of said video streams, and
display the at least one image portion, from the image portions of said plurality of image portions, corresponding to the received value of the choice parameter, and an additional image portion comprising a plurality of image data sets, each image data set originating from a respective video stream, wherein the image data of the additional image portion correspond to a time of the image data of the at least one image portion corresponding to the received choice parameter value,
wherein the device commands the display of at least one of the at least one image portion corresponding to the received choice parameter value and the additional image portion by commanding
capturing at least one image portion of a current image of the sequence of images, and
commanding image display of a stationary image originating from the captured at least one image portion, and
repeatedly and continuously updating, while and as long as the display occurs, the displayed stationary image with stationary images originating from captured portions of subsequent images of the received sequence at a refreshment rate high enough to create the illusion of a video display.

15. A device for navigating multisource video, comprising at least one processing unit operating in conjunction with a memory to:
receive a sequence of images, each image of said sequence comprising a plurality of image portions, the image portions of said plurality comprising image data originating from synchronized images of respective video streams, each video stream originating from a corresponding source,
receive a choice parameter value originating from a user interface, said value corresponding to one at least of said video streams, and
display at least one image portion, from the image portions of said plurality of image portions, corresponding to the received choice parameter value, and display an additional image portion comprising a plurality of image data sets, each image data set originating from a respective video stream,
wherein
the additional image portion corresponds, from the user perception, to a same time as the at least one image portion corresponding to the received choice parameter value,
the device is arranged, so as to, command the display of at least one of the at least one image portion corresponding to the received choice parameter value and the additional image portion by
capturing an image portion of a current image of the received sequence of images,
commanding image display of a stationary image originating from the captured at least one image portion, and
regularly reiterating the capturing and stationary image display for subsequent images of the received sequence so as to create the illusion of a video display.

* * * * *